US008660868B2

(12) United States Patent
Vogel et al.

(10) Patent No.: US 8,660,868 B2
(45) Date of Patent: Feb. 25, 2014

(54) ENERGY BENCHMARKING ANALYTICS

(75) Inventors: Andreas Vogel, San Francisco, CA (US); Simon Lee, Castro Valley, CA (US); Zhe Pu, San Francisco, CA (US); Alan Southall, Walldorf (DE); Michael Haft, Zorneding (DE); Christine Preisach, Sankt Leon-Rot (DE)

(73) Assignee: SAP AG, Walldorf (DE)

( * ) Notice: Subject to any disclaimer, the term of this patent is extended or adjusted under 35 U.S.C. 154(b) by 163 days.

(21) Appl. No.: 13/239,833

(22) Filed: Sep. 22, 2011

(65) Prior Publication Data

US 2013/0080210 A1 Mar. 28, 2013

(51) Int. Cl.
*G06Q 10/00* (2012.01)

(52) U.S. Cl.
USPC ............................ 705/7; 705/8; 705/9; 705/10

(58) Field of Classification Search
USPC .................................................. 705/7, 8, 9, 10
See application file for complete search history.

(56) References Cited

U.S. PATENT DOCUMENTS

| 4,283,772 | A | 8/1981 | Johnston | |
|---|---|---|---|---|
| 6,178,362 | B1 * | 1/2001 | Woolard et al. | 700/295 |
| 6,785,592 | B1 * | 8/2004 | Smith et al. | 700/291 |
| 8,019,697 | B2 | 9/2011 | Ozog | |
| 8,183,995 | B2 | 5/2012 | Wang et al. | |
| 8,311,863 | B1 | 11/2012 | Kemp | |
| 8,321,064 | B2 | 11/2012 | Itoh et al. | |
| 8,340,832 | B1 | 12/2012 | Nacke et al. | |
| 2001/0020219 | A1 * | 9/2001 | Kishlock et al. | 702/61 |
| 2002/0116282 | A1 * | 8/2002 | Martin et al. | 705/26 |
| 2003/0004660 | A1 * | 1/2003 | Hunter | 702/61 |
| 2008/0272934 | A1 | 11/2008 | Wang | |
| 2009/0281673 | A1 | 11/2009 | Taft | |
| 2009/0281674 | A1 | 11/2009 | Taft | |
| 2010/0090862 | A1 | 4/2010 | Dubrow et al. | |
| 2010/0152910 | A1 | 6/2010 | Taft | |
| 2010/0217453 | A1 | 8/2010 | Itoh et al. | |
| 2010/0235008 | A1 | 9/2010 | Forbes, Jr. et al. | |
| 2011/0004446 | A1 | 1/2011 | Dorn et al. | |
| 2011/0035073 | A1 | 2/2011 | Ozog | |
| 2011/0112987 | A1 | 5/2011 | Basak et al. | |
| 2011/0119517 | A1 | 5/2011 | Beeco et al. | |
| 2011/0208366 | A1 | 8/2011 | Taft | |
| 2011/0231028 | A1 | 9/2011 | Ozog | |
| 2011/0264291 | A1 | 10/2011 | Le Roux et al. | |

(Continued)

OTHER PUBLICATIONS

"U.S. Appl. No. 13/239,922, Examiner Interview Summary mailed Jun. 14, 2013", 3 pgs.

(Continued)

*Primary Examiner* — Nga B. Nguyen
(74) *Attorney, Agent, or Firm* — Schwegman Lundberg & Woessner, P.A.

(57) ABSTRACT

A benchmarking computing application is configured to create a benchmark run for a segment of customer profiles. Customer profiles from the segment include a parameter, termed an adjustment parameter, that may affect energy consumption by the associated customer. The results of the benchmark run include energy consumption values for individual customer profiles in the segment, an average energy consumption value for the entire segment of customer profiles, and also adjustment energy consumption value. The adjustment energy consumption value reflects the portion of energy consumption by a particular customer attributed to the difference between the average value of the adjustment parameter for the segment and the value of the adjustment parameter for the particular customer profile.

20 Claims, 8 Drawing Sheets

(56) References Cited

U.S. PATENT DOCUMENTS

| | | |
|---|---|---|
| 2012/0046798 A1 | 2/2012 | Orthlieb et al. |
| 2012/0095794 A1 | 4/2012 | Guthridge |
| 2012/0095841 A1 | 4/2012 | Luckerman et al. |
| 2012/0150359 A1 | 6/2012 | Westergaard |
| 2013/0079938 A1 | 3/2013 | Lee et al. |

OTHER PUBLICATIONS

"U.S. Appl. No. 13/239,922, Final Office Action mailed Jun. 21, 2013", 21 pgs.

"U.S. Appl. No. 13/239,922, Non Final Office Action mailed Feb. 14, 2013", 20 pgs.

"U.S. Appl. No. 13/239,922, Response filed Jun. 6, 2013 to Non-Final Office Action mailed Feb. 14, 2013", 15 pages.

Capasso, A., et al., "A bottom-up approach to residential load modeling", IEEE Transactions on Power Systems, 9(2), (1994), 957-964.

Farinaccio, L., et al., "Using a pattern recognition approach to disaggregate the total electricity consumption in a house into the major end-uses", Energy and Buildings, 30(3), Elsevier, (1999), 245-259.

Lo, K. L, et al., "Electricity consumer classification using artificial intelligence", UPEC 2004. 39th International Universities Power Engineering Conference, 2004., ieeexplore.ieee.org, (2004), 443-447.

Ringwood, J. V, et al., "Forecasting Electricity Demand on Short, Medium and Long Time Scales Using Neural Networks", Journal of Intelligent and Robotic Systems, 31(1-3), Springer, (2001), 129-147.

Yu, I. H, et al., "A method for classification of electricity demands using load profile data", Fourth Annual ACIS International Conference on Computer and Information Science, 2005., ieeexplore.ieee.org, (2005), 164-168.

* cited by examiner

Create a Benchmark Run

1.1 SELECT A SEGMENT

SELECT A SEGMENT TO USE FOR BENCHMARKING BY USING THE FILTER TO FIND AND HIGHLIGHT A SEGMENT. OR, CREATE A NEW SEGMENT

SEGMENTS

| SEGMENT NAME | SEGMENT CATEGORY | SEGMENT STATUS | CREATED BY | CREATED ON | CHANGED BY | CHANGED ON |
|---|---|---|---|---|---|---|
| GREATER HOUSTON | CAMPAIGN, TARIFF... | ACTIVE | ROBIN_THOMAS | 14.12.2010 | ROBIN_THOMAS | 14.12.2010 |
| DALLAS | CAMPAIGN, TARIFF... | ACTIVE | HENRY_SUN | 14.12.2010 | HENRY_SUN | 14.12.2010 |
| HOUSTON | CAMPAIGN, TARIFF... | ACTIVE | CARLOS_GARCIA | 10.12.2010 | CARLOS_GARCIA | 10.12.2010 |

SEGMENT SUMMARY

CUSTOMER COUNT: 101,244

SELECTION CRITERIA:
INDUSTRY CODE: RESIDENTIAL
COUNTRY: US
AIR CONDITIONING (Y/N): Y

1.2 SELECT PARAMETERS

PEER GROUP TYPE

SELECT EITHER THE MANUAL OR AUTOMATED OPTION FOR DETERMINING THE PEER GROUP TO BE USED AS THE BASIS FOR THE BENCHMARKING RUN.

○ USE THE SEGMENT SELECTED FROM 1.1 AS THE PEER GORUP (SEGMENT)    ● MANUALLY SELECT PEER GROUP ATTRIBUES (MANUAL)

MODEL TYPE

SELECT THE APPROPRIATE INDUSTRY MODEL TO BE USED FOR THIS BENCHMARKING RUN.

[ RESIDENTIAL ▼ ]

PEER GROUP ATTRIBUTES

SELECT THE RELEVANT PEER GROUP ATTRIBUTES – THESE ATTIRUBES WILL DETERMINE HOW THE PEER GROUP (THE BASIS THAT A CUSTOMER IS COMPARED TO) IS ACTUALLY FORMED.

☑ BUILDING TYPE (HOUSE VS. APARTMENT)
☑ LOCATION
☑ POOL
☑ ELECTRICAL HEATING
☑ AGE OF BUILDING

MODEL ATTRIBUTES

SELECT THE RELEVANT MODEL ATTRIBUTES THAT CORRELATE WITH THE CONSUMPTION BEHAVIOR.

☑ SQUARE FOOTAGE
☑ FAMILY SIZE

CONSUMPTION PERIOD

SELECT THE TIME PERIOD TO BE USED FOR SELECTING THE CONSUMPTION DATA FOR THE ACTUAL BENCHMARKING.

● LAST [ 1 ] MONTH(S)
○ ALL AVAILABLE DATA

*FIG. 1*

Greater Houston – Benchmark Results

BENCHMARK RUN COMPLETION DATE: 03.23.2011 12:00 AM  CONSUMPTION PERIOD: 02.23.2010 – 03.23.2011

CUSTOMER OPPORTUNITIES  EXPORT

| SITE NAME | BUILDING TYPE | LOCATION | POOL | ELECTRICAL HEATING | AGE OF BUILDING | SQUARE FOOTAGE | FAMILY SIZE | AVERAGE DAILY CONSUMPTION | BENCHMARKING SCORE (PREDICTION ERROR) |
|---|---|---|---|---|---|---|---|---|---|
| 0278 - WOODWARD | HOUSE | GREATER HOUSTON | NO | NO | 25 | 1,534 | 4 | 1,359.24 | 351.12 |
| 0279 - WOODWARD | HOUSE | GREATER HOUSTON | NO | NO | 15 | 1,864 | 4 | 1,000.46 | 321.76 |
| 0280 - WOODWARD | HOUSE | GREATER HOUSTON | NO | NO | 1 | 2,245 | 2 | 1,200.32 | 311.94 |
| 0281 - WOODWARD | HOUSE | GREATER HOUSTON | YES | NO | 5 | 2,524 | 3 | 900.84 | 301.32 |
| 0282 - WOODWARD | HOUSE | GREATER HOUSTON | NO | YES | 15 | 1,250 | 1 | 1,120.26 | 294.45 |
| 0283 - WOODWARD | HOUSE | GREATER HOUSTON | NO | YES | 5 | 1,987 | 1 | 1,050.90 | 276.12 |
| 0284 - WOODWARD | HOUSE | GREATER HOUSTON | YES | YES | 1 | 2,350 | 2 | 1,250.61 | 254.82 |

CONSUMPTION ANALYSIS: 0278 WOODWARD

MODEL DETAILS  BENCHMARK SCORE EXPLANATION  HOURLY CONSUMPTION  WEEKLY CONSUMPTION  SEASONAL CONSUMPTION

ADDRESS: 8069 WOODWARD ST.
HOUSTON, TX 77051
US

WEATHER REGION: HOUSTON

| FEATURES | THIS SITE | AVERAGE ALL SITES |
|---|---|---|
| BUILDING TYPE | HOUSE | HOUSE |
| LOCATION | GREATER HOUSTON | GREATER HOUSTON |
| POOL | NO | NO |
| ELECTRICAL HEATING | NO | NO |
| AGE OF BUILDING | 25 | 9.57 |
| SQUARE FOOTAGE | 1,534 | 1,964.86 |
| FAMILY SIZE | 4 | 2.29 |
| AVERAGE DAILY CONSUMPTION | 1,359.24 | 1,160.35 |
| BENCHMARKING SCORE | 351.12 | 124.84 |

FIG. 2

ENERGY BENCHMARKING ANALYTICS

TECHNICAL FIELD

This application relates to the technical fields of software and/or hardware technology and, in one example embodiment, to system and method to create energy consumption benchmarks.

BACKGROUND

With the advent of Smart Grid technology and Advanced Metering Infrastructure (AMI) utility companies now have an opportunity to analyze the actual energy consumption patterns of their customers. AMI data may be collected by so-called smart meters. A smart meter is a device that can be installed at the customer's premises that collects, periodically, consumption of electric energy and automatically communicates this collected information to the utility company. A smart meter may be configured to collect energy consumption information in certain intervals, e.g., in intervals of an hour or less.

The analysis of consumption patterns based on actual AMI data represents a major technical challenge due to the sheer scale of the problem: millions of customers multiplied by energy consumption reading occurring as often as at fifteen minute intervals. As a result, marketing departments of utility companies have to rely on simple consumption measurements (such as, e.g., average monthly energy consumption by a customer) and master data attributes (such as, e.g., geographical location of a customer) that does not allow for an easy way to compare the efficiency of energy usage by different customers.

BRIEF DESCRIPTION OF DRAWINGS

Embodiments of the present invention are illustrated by way of example and not limitation in the figures of the accompanying drawings, in which like reference numbers indicate similar elements and in which:

FIG. 1 shows an example user interface for obtaining a selection of a customer segment for a benchmark run, in accordance with an example embodiment;

FIG. 2 shows an example user interface presenting the results of a benchmark run, in accordance with an example embodiment;

DETAILED DESCRIPTION

Figure 3:
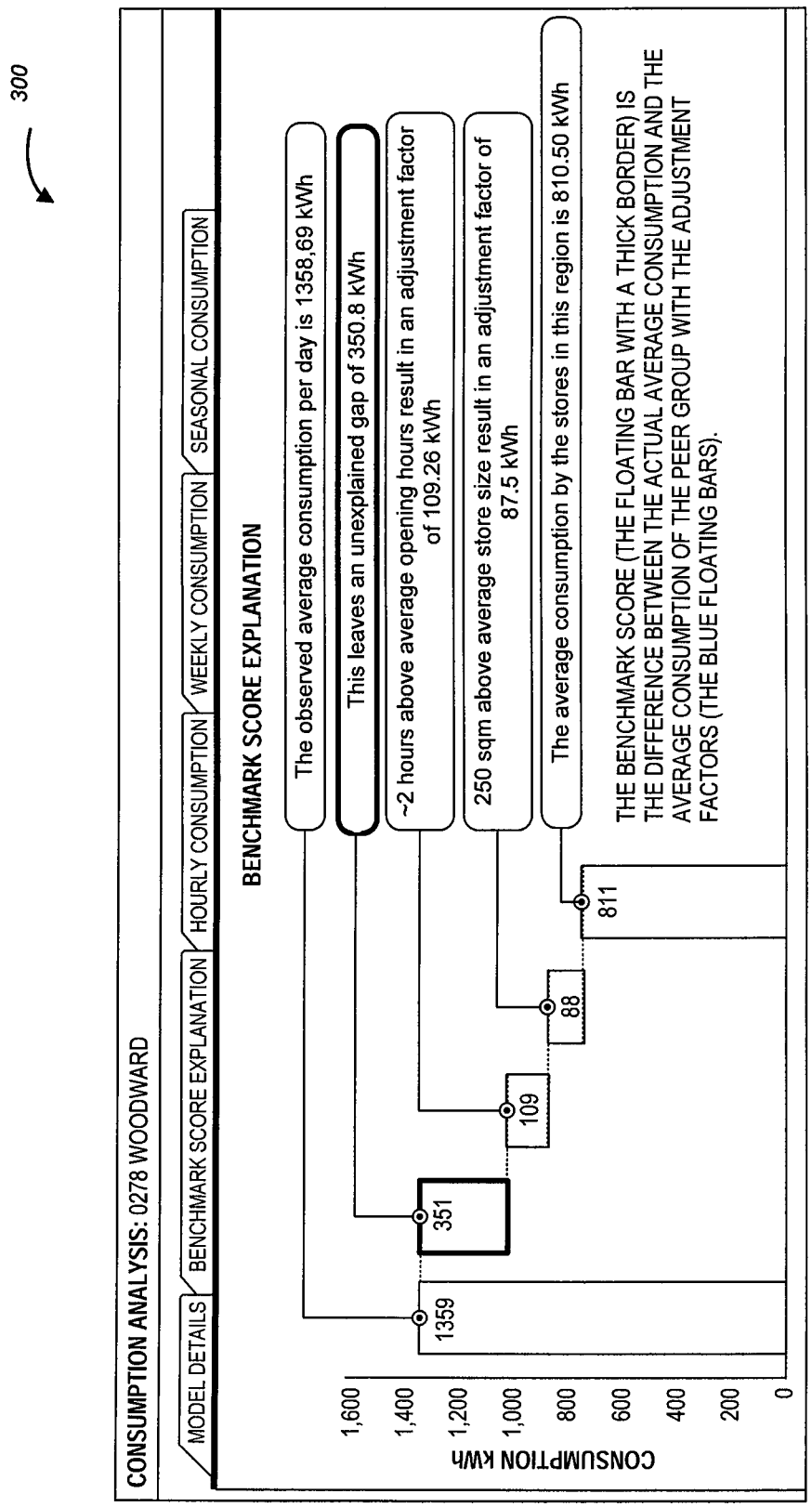
FIG. 3 shows an example user interface presenting adjustments made to energy consumption value associated with a customer profile, in accordance with an example embodiment.

A method and system to create energy consumption benchmarks is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

Method and system are provided for creating energy consumption benchmarks for a group of customer profiles representing customers of a utility company. In one embodiment, method and system for creating energy consumption benchmarks may be implemented as a computing application termed a benchmarking application. A benchmarking application may be configured to permit a user to select a group of customer profiles for a benchmark run and view the results of the run, e.g. in a tabular or a graphical format. A benchmark run may be performed using one of a variety of regression algorithms, one of which is a linear regression algorithm. The results of a benchmark run may include a visual representation of a value reflecting the average energy consumption for the group over the specified period of time and a value reflecting energy consumption for that period of time by a customer associated with a particular customer profile, such that it would present an illustration of how a particular customer's energy usage compares to the average usage calculated for the similarly situated energy customers.

As energy usage by customers that are situated similarly enough to be associated with the same group may depend on various respective characteristics of the customers, customers' profiles may include respective information storing values reflecting those characteristics. For example, different residential customers may have different number of persons in their household, while different small business customers may have different hours of operation, both of which factors may affect the amount of consumed energy. A customer profile may be associated with parameters reflecting such characteristics. A benchmarking application may be configured to determine an average value for a certain parameter and, based on the difference between the average value and the value for that parameter associated with a particular customer profile, provide an adjustment value for the customer's energy consumption measurement.

Customer profiles may be segmented based on various common characteristics of the associated energy customers. For example, customer profiles for residential customers may be associated with one group, while customer profiles associated with commercial customers may be associated with a different group. The word "grouping," for the purposes of this description, may be used interchangeable with the word "segmenting" and the groups of customer profiles may be referred to as "customer segments." FIG. 1 shows a user interface 100 for obtaining a selection of a customer segment for a benchmark run, in accordance with an example embodiment.

A benchmark run is performed for a period of time that may be specified by a user requesting the run, e.g., via a graphical user interface such as the user interface 100. Alternatively, a benchmark run for a certain customer segment may be performed periodically, e.g., automatically once a month for the period of the previous thirty days. Results of an example benchmark run are shown in FIG. 2.

A user interface 200 illustrated in FIG. 2 includes an area 210 that shows values for various characteristics included in the profile of the selected customer from a customer segment (here, a profile associated with a residential address in the Greater Houston area), as well as the average values for the same characteristics calculated for all customer profiles in the segment.

Figure 4:
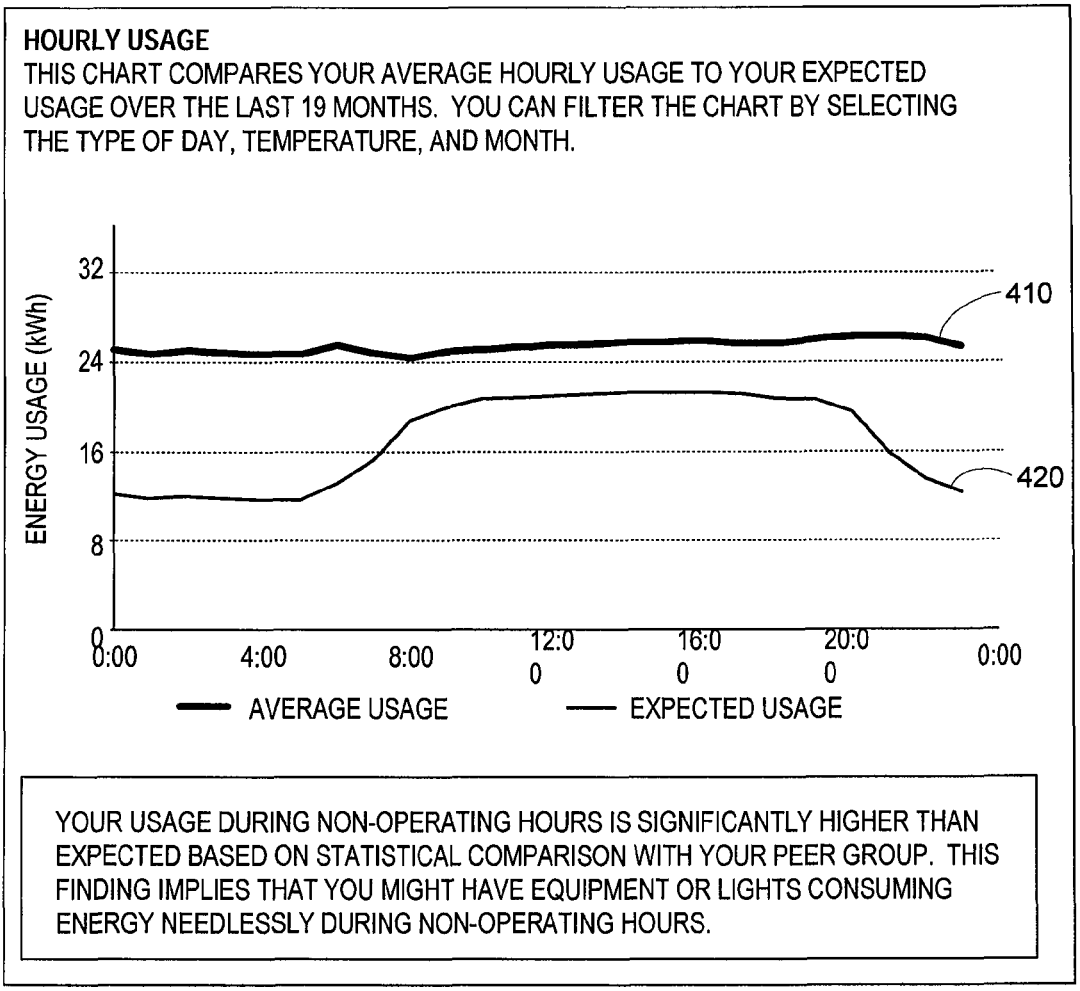
FIG. 4 shows an example user interface showing a graph reflecting hourly energy usage by a customer whose profile is being analyzed and a graph reflecting average hourly usage based on the smart meter data collected for all customer profiles in the associated segment, in accordance with an example embodiment.

FIG. 3 shows an example user interface 300 presenting adjustments made to energy consumption value associated with a customer profile. As can be seen from the bar graph in FIG. 3, the greater-than-average energy consumption recorded for the particular customer (a store) may be partially explained by the greater-than-average size of the store and longer opening hours. The bar graph shown in FIG. 3 also illustrates that even after taking into account the greater-than-average size of the store and longer opening hours, this customer's energy consumption is greater than average and may indicate inefficient energy usage. In some embodiments, a benchmarking application may be configured to use smart meter data to generate a graph reflecting hourly energy usage (or some other pattern of energy usage, e.g., daily or weekly) by the customer whose profile is being analyzed, as well as a graph reflecting average hourly usage based on the smart meter data collected for all customer profiles in the segment. FIG. 4 shows an example user interface 400 presenting such graphs.

In FIG. 4, graph 410 is a graph reflecting hourly energy usage by the customer whose profile is being analyzed and graph 420 is a graph reflecting average hourly usage based on the smart meter data collected for all customer profiles in the segment. As can be seen in FIG. 4, the graph 410 indicates that energy usage by the customer does not change significantly throughout a 24-hour period. The graph 420, on the other hand, indicates that similarly situated customers (here customers associated with customer profiles from the segment), on average, use significantly less energy during the night hours. From viewing the graphs 410 and 420 it may inferred that the customer whose profile is being analyzed may be leaving the lights on during the night hours.

Figure 5:
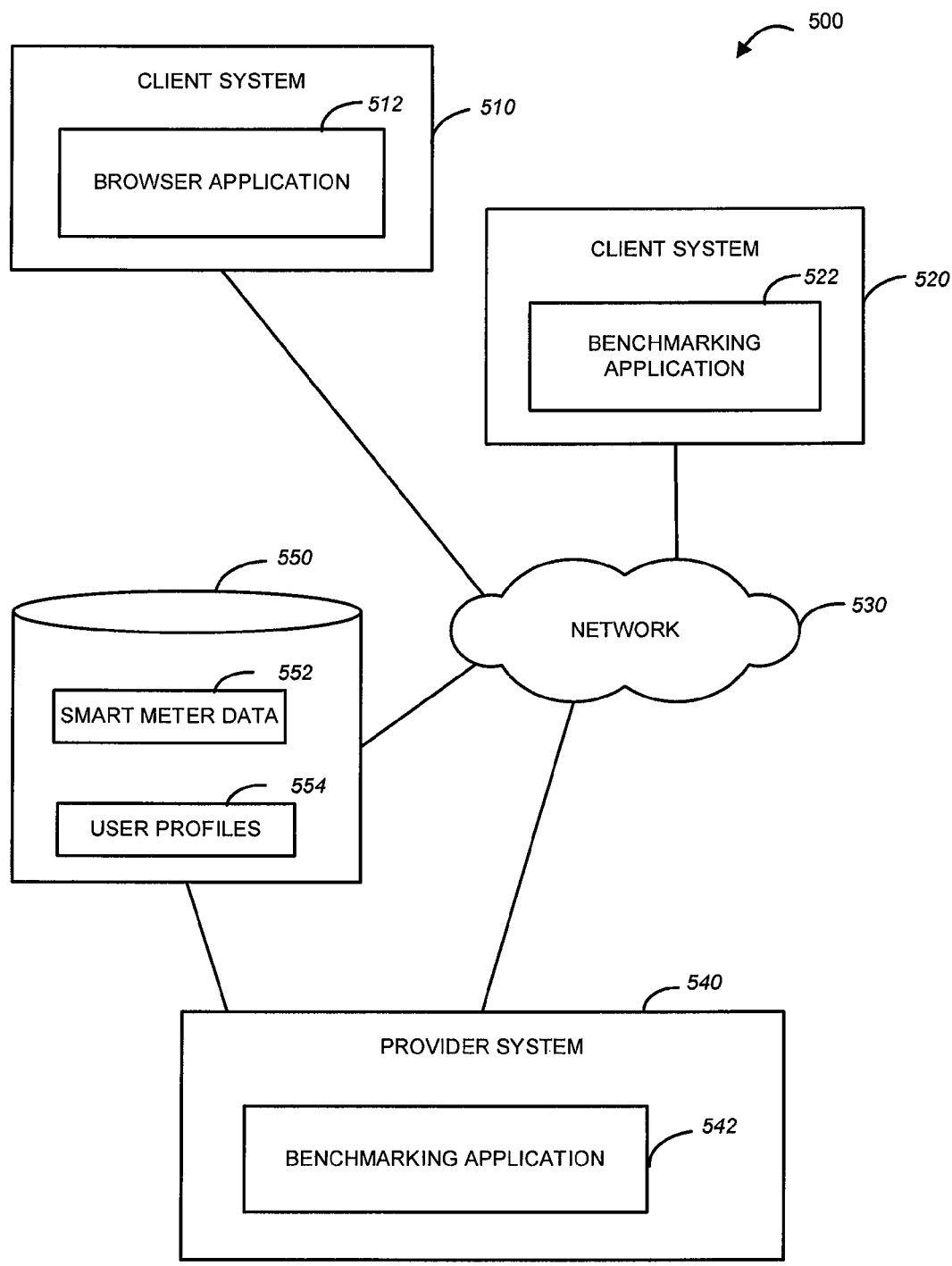
FIG. 5 is a diagrammatic representation of a network environment within which an example method and system to create energy consumption benchmarks may be implemented.

An example method and system to create energy consumption benchmarks may be implemented, in the context of a network environment 500 illustrated in FIG. 5. As shown in FIG. 5, the network environment 500 may include client systems 510 and 520 and a server system 540. The server system 540, in one example embodiment, may host a benchmarking application 542. The benchmarking application 542 may be configured to create a benchmark run for a segment of customer profiles. As mentioned above, customer profiles from the segment include one or more parameters that may affect energy consumption by the associated customer. Such parameters may be termed "adjustment parameters." The results of the benchmark run performed by the benchmarking application 542 include energy consumption values for individual customer profiles in the segment, an average energy consumption value for the entire segment of customer profiles, and also one or more adjustment energy consumption values. An adjustment energy consumption value reflects the portion of energy consumption by a particular customer attributed to the difference between the average value of the adjustment parameter for the segment and the value of the adjustment parameter for the particular customer profile. The benchmarking application 542 may also be configured to generate a graphical representation of energy consumption data illustrating hourly energy usage by an individual customer and average hourly usage based on the smart meter data collected for all customer profiles in the segment, such as, e.g., the graphs shown in FIG. 4. The energy consumption data may be stored in a storage system 550, e.g., as smart meter data 552. The storage system 550 may also store smart meter data 552 and customer profiles 554.

The benchmarking application 542 may be used together with a clustering application (not shown) that may also be executing on the provider system 540. In one example embodiment, a customer segment may be a segment created by a so-called segmentation application. A segmentation application may be configured to apply statistical clustering and pattern recognition techniques to the voluminous energy consumption data collected by smart meters and, based on the results of the processing, generate pattern profiles (also termed clusters) that represent energy usage patterns in the course of a period of time (e.g., a 24 hour period, a day, a week, etc.). The smart meter data may be represented in the form of value-days, where a value-day comprises energy consumption measurements for a customer at different times during a 24-hour period. A value day may thus be viewed as represented by a curve having a shape determined by a plurality of time/energy consumption value pairs. Each value day is associated with a profile of a particular energy customer. Conversely, a customer profile may be associated with energy consumption data in the form of value days. A cluster of value days, created by applying a clustering algorithm (e.g., the k-mean algorithm) to a set of value days, contains those value days that have curves of similar shapes and thus represent a particular energy usage pattern. A segment of customer profiles selected for a benchmark run may be a segment created by a segmentation application.

The client system 550 may utilize a browser application 512 to access the benchmarking application 542 via a browser application 512 executing on the client system 510 via a communications network 530. The communications network 530 may be a public network (e.g., the Internet, a wireless network, etc.) or a private network (e.g., a local area network (LAN), a wide area network (WAN), Intranet, etc.). In some embodiments, a benchmarking application may be executing locally with respect to a client system, such as, e.g., a benchmarking application 522 executing on the client system 520. An example embodiment of a benchmarking application is illustrated in FIG. 6.

Figure 6:
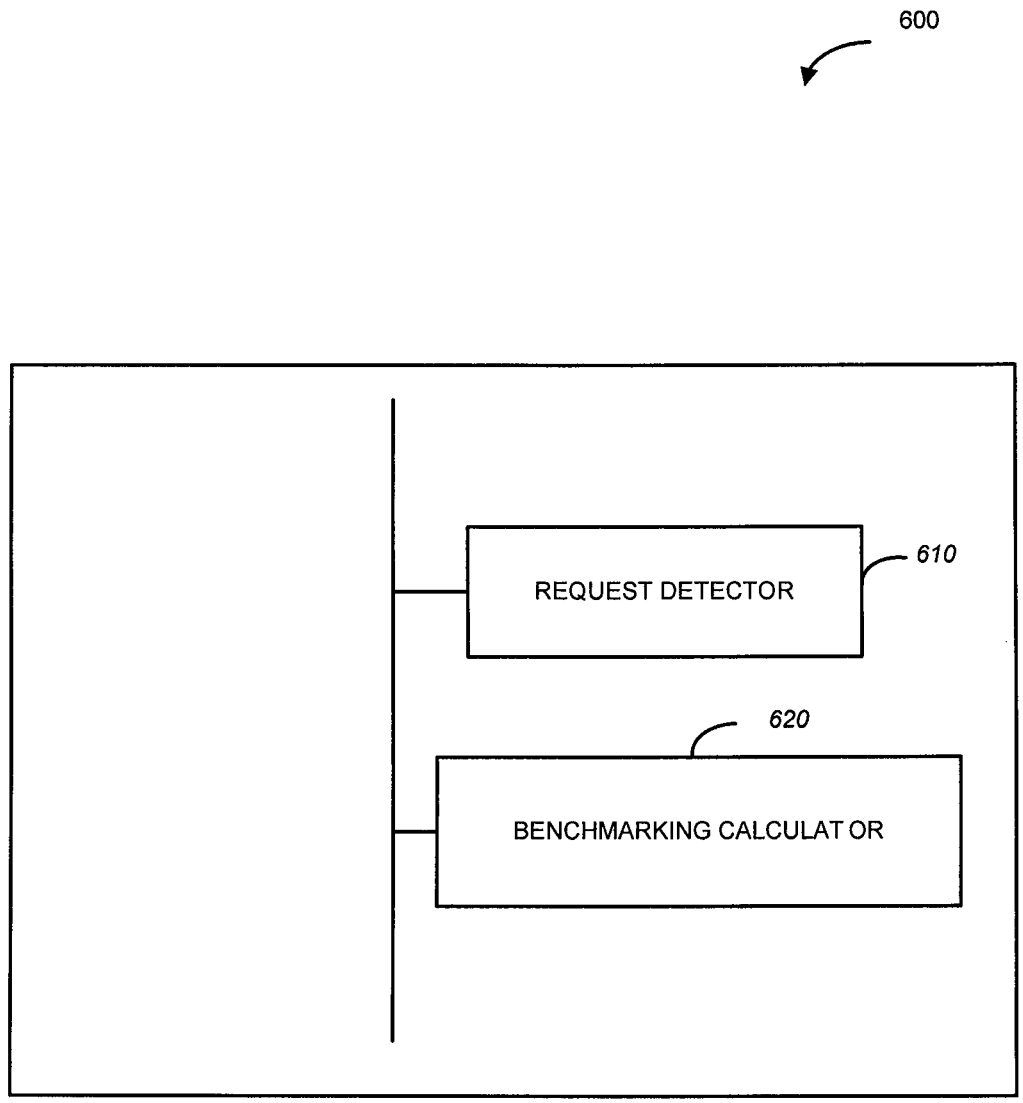
FIG. 6 is a block diagram of a system to create energy consumption benchmarks, in accordance with one example embodiment.

FIG. 6 is a block diagram of a system 600 for segmenting customer profiles utilizing smart meter data, in accordance with one example embodiment. In some embodiments, the system 600 is a benchmarking application that may be executing on a server computer system or on a client computer system. As shown in FIG. 6, the system 600 includes a request detector 610 and a benchmarking calculator 620. The request detector 610 may be configured to receive a request to create a benchmark run A request to create a benchmark run is associated with a period of time for which the benchmark run is to be created and with a segment of customer profiles. For example, as shown in FIG. 1 mentioned above, the time period of one month was selected to be used for benchmarking. Also shown in FIG. 1 is that a segment of customer profile that can be selected for benchmarking may be associated with customers who reside in a certain geographic location. Each customer profile is associated with energy consumption data and one or more characteristics that may affect customer's energy consumption termed adjustment parameters. As can be seen in FIG. 1, these adjustment parameters (labeled as "attributes" in FIG. 1) may include a building type, a geographical location, an age of a building, swimming pool presence, and electrical heating presence, square footage, family size (e.g., the number of household members), etc.

The benchmarking calculator 620 may be configured to calculate an average energy consumption value for the selected segment of customer profiles for the period of time and to also calculate respective average values for the adjustment parameters and to determine adjustment energy consumption value that indicates what portion of the energy consumption value determined for a customer can be attributed to the difference between the customer value for the adjustment parameter and the average value for the adjustment parameter. For example, the benchmarking calculator 620 may determine a difference between the average value for the adjustment parameter and the customer value for the adjustment parameter, determine the difference between the average energy consumption value and the customer energy consumption value, and determine an adjustment energy consumption value, the adjustment energy consumption value (also termed an adjustment parameter) reflecting a portion of the customer energy consumption value attributed to the determined difference between the average energy consumption value and the customer energy consumption value. Adjustment parameters may also be referred to as model parameters. Example of adjustment parameters are shown in FIG. 3 that was mentioned above.

The system 600 may also include a view generator (not shown) to generate various views, such as, e.g., views shown in FIG. 1-4. Example operations performed by the system 600 can be described with reference to FIG. 7.

Figure 7:
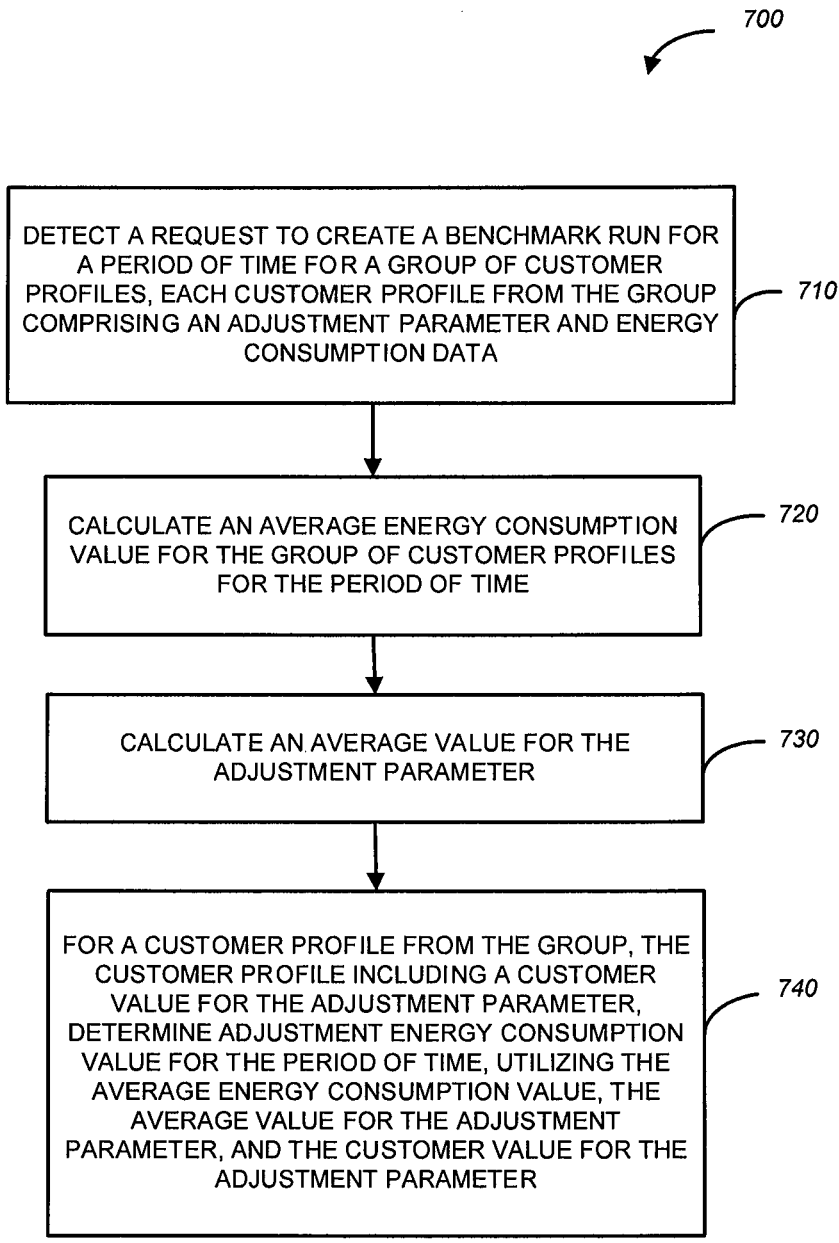
FIG. 7 is a flow chart of a method to create energy consumption benchmarks, in accordance with an example embodiment.

FIG. 7 is a flow chart of a method 700 for creating a benchmark run, according to one example embodiment. The method 700 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 540 of FIG. 5 and, specifically, at the system 600 shown in FIG. 6.

As shown in FIG. 7, the method 700 commences at operation 710, when the request detector 610 of FIG. 6 detects a request to create a benchmark run for a period of time for a segment of customer profiles. At operation 720, the benchmarking calculator 620 of FIG. 6 calculates an average energy consumption value for the segment of customer profiles for the period of time. At operation 730, the benchmarking calculator 620 calculates average value for the adjustment parameter. At operation 740, the benchmarking calculator 620 determines adjustment energy consumption value for the period of time for a customer profile from the segment utilizing the average energy consumption value, the average value for the adjustment parameter, and the customer value for the adjustment parameter included in the customer profile.

Figure 8:
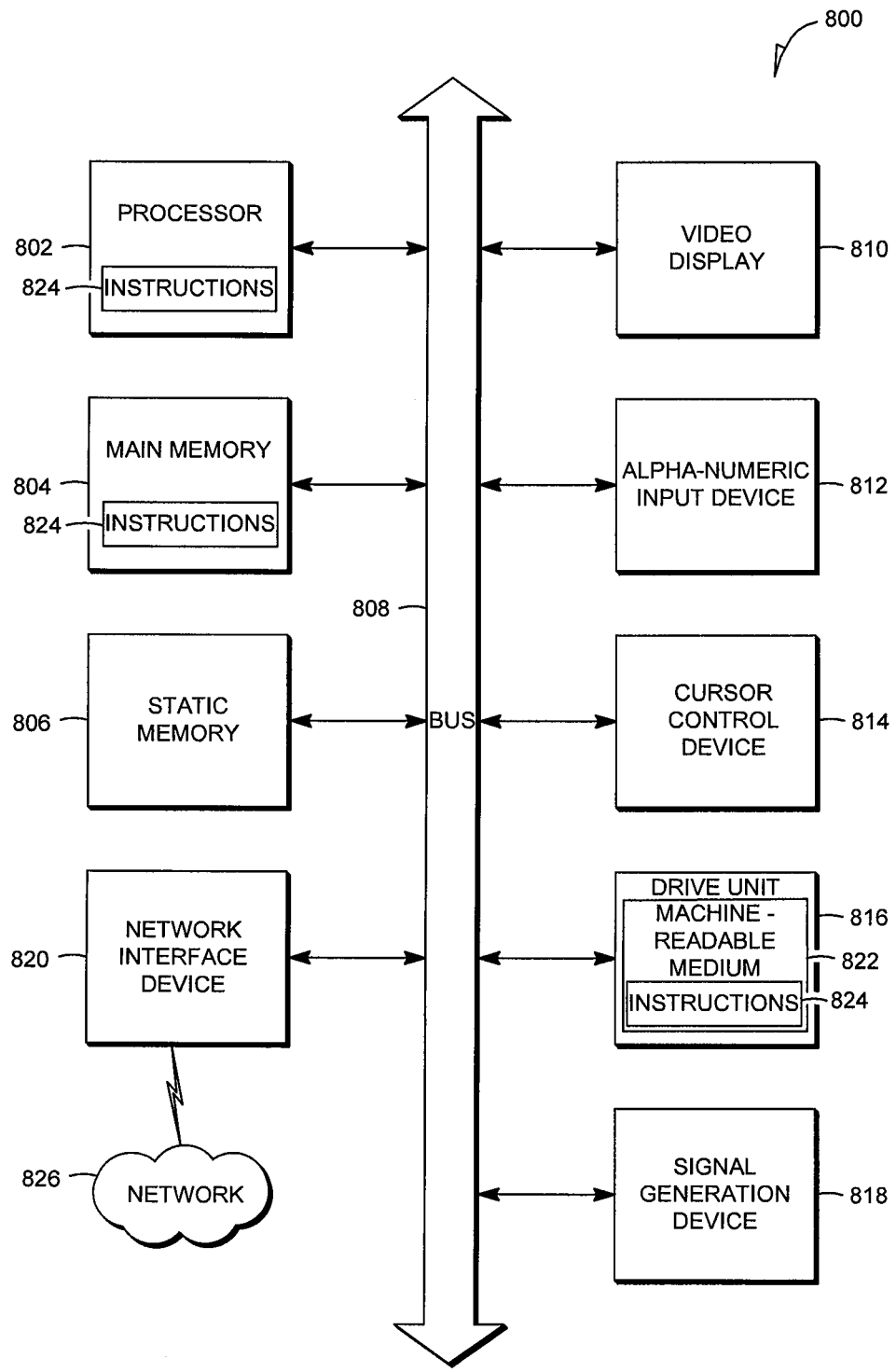
FIG. 8 is a diagrammatic representation of an example machine in the form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to create energy consumption benchmarks has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    detecting a request to create a benchmark run for a period of time for a segment of customer profiles, each customer profile from the segment comprising an adjustment parameter and customer energy consumption data, the adjustment parameter representing an attribute that affects energy consumption by a customer represented by a customer profile from the cluster;
    calculating, utilizing at least one processor an average energy consumption value for the segment of customer profiles for the period of time, the segment comprising a plurality of customer profiles;
    calculating, utilizing at least one processor an average value for the adjustment parameter based on values of adjustment parameters calculated for respective customer profiles from the segment of customer profiles; and
    for a particular customer profile from the segment, the particular customer profile including a customer value for the adjustment parameter, determining adjustment energy consumption value for the period of time, the adjustment energy consumption value reflecting a portion of energy consumption by a customer represented by the particular customer profile attributed to difference between the average value for the adjustment parameter and the customer value for the adjustment parameter.

2. The method of claim 1, comprising generating a a visual-representation of the customer energy consumption value, the adjustment energy consumption value, and the average energy consumption value.

3. The method of claim 1, wherein the determining of the adjustment energy consumption value comprises:
    determining a difference between the average value for the adjustment parameter and the customer value for the adjustment parameter;
    determining a difference between the average energy consumption value and the customer energy consumption value; and
    determining an adjustment energy consumption value, the adjustment energy consumption value reflecting a portion of the customer energy consumption value attributed to the determined difference between the average energy consumption value and the customer energy consumption value.

4. The method of claim 1, comprising receiving a selection of the segment of customer profiles via a graphical user interface.

5. The method of claim 1, wherein the segment comprises customer profiles identified as associated with a cluster of value days, each value day from the cluster of value days being associated with a customer profile, each value day from the plurality of value days comprising a plurality of energy consumption measurements at different times during a 24-hour period.

6. The method of claim 1, comprising receiving a selection of the adjustment parameter, via a graphical user interface.

7. The method of claim 1, wherein the adjustment parameter is selected form a segment consisting of a building type, a geographical location, an age of a building, swimming pool presence, and electrical heating presence.

8. The method of claim 1, comprising generating a graph reflecting a pattern of energy usage by a customer associated with the particular customer profile and a graph reflecting average hourly usage based on energy consumption data collected for all customer profiles in the segment.

9. The method of claim 1, wherein the pattern of energy usage is based on hourly energy measurements.

10. The method of claim 1, wherein the request to create a benchmark run is from a plurality of periodic requests to create a benchmark runs.

11. A computer-implemented system comprising:
    a memory;
    at least one processor coupled to the memory;
    a request detector to detect a request to create a benchmark run for a period of time for a segment of customer profiles, each customer profile from the segment comprising an adjustment parameter and energy consumption data, the adjustment parameter representing an attribute that affects energy consumption by a customer represented by a customer profile from the cluster; and
    a benchmarking calculator to:
        calculate an average energy consumption value for the segment of customer profiles for the period of time and an average value for the adjustment parameter, the segment comprising a plurality of customer profiles,
        calculate an average value for the adjustment parameter based on values of adjustment parameters calculated for respective customer profiles from the segment of customer profiles, and
        determine adjustment energy consumption value for the period of time for a particular customer profile from the segment, the particular customer profile including a customer value for the adjustment parameter, the adjustment energy consumption value reflecting a portion of energy consumption by a customer represented by the particular customer profile attributed to difference between the average value for the adjustment parameter and the customer value for the adjustment parameter.

12. The system of claim 11, comprising a view generator to generate a visual representation of the customer energy consumption value, the adjustment energy consumption value, and the average energy consumption value.

13. The system of claim 11 wherein the benchmarking calculator is to:
    determine a difference between the average value for the adjustment parameter and the customer value for the adjustment parameter;
    determine a difference between the average energy consumption value and the customer energy consumption value; and
    determine an adjustment energy consumption value, the adjustment energy consumption value reflecting a portion of the customer energy consumption value attributed to the determined difference between the average energy consumption value and the customer energy consumption value.

14. The system of claim 11, Wherein the request detector is to detect a selection of the segment of customer profiles, the selection obtained via a graphical user interface.

15. The system of claim 11, wherein the segment comprises customer profiles identified as associated with a cluster of value days, each value day from the cluster of value days being associated with a customer profile, each value day from the plurality of value days comprising a plurality of energy consumption measurements at different times during a 24-hour period.

16. The system of claim 11, wherein the request detector is to detect a selection of the adjustment parameter, the selection obtained via a graphical user interface.

17. The system of claim 11, wherein the adjustment parameter is selected form a segment consisting of a building type, a geographical location, an age of a building, swimming pool presence, and electrical heating presence.

18. The system of claim 11, comprising a view generator to generate a view, the view comprising a graph reflecting a pattern of energy usage by a customer associated with the particular customer profile and a graph reflecting average hourly usage based on energy consumption data collected for all customer profiles in the segment.

19. The system of claim 11, wherein the pattern of energy usage is based on hourly energy measurements.

20. A machine-readable non-transitory medium having instruction data to cause a machine to:
   detect a request to create a benchmark run for a period of time for a segment of customer profiles, each customer profile from the segment comprising an adjustment parameter and customer energy consumption data, the adjustment parameter representing an attribute that affects energy consumption by a customer represented by a customer profile from the cluster;
   calculate an average energy consumption value for the segment of customer profiles for t period of time, the segment comprising a plurality of customer profiles;
   calculate an average value for the adjustment parameter based on values of adjustment parameters calculated for respective customer profiles from the segment of customer profiles; and
   for a particular customer profile from the segment, the particular customer profile including a customer value for the adjustment parameter, determining adjustment energy consumption value for the period of time, the adjustment energy consumption value reflecting a portion of energy consumption by a customer represented by the particular customer profile attributed to difference between the average value for the adjustment parameter and the customer value for the adjustment parameter.

* * * * *